United States Patent
Gresset

(10) Patent No.: US 12,273,139 B2
(45) Date of Patent: Apr. 8, 2025

(54) METHOD, DEVICE, COMPUTER PROGRAM PRODUCT, AND NON-TRANSITORY INFORMATION STORAGE MEDIUM FOR ESTIMATING PERFORMANCE OF WIRELESS COMMUNICATION NETWORK

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/039,666

(22) PCT Filed: Dec. 10, 2021

(86) PCT No.: PCT/JP2021/046655
§ 371 (c)(1),
(2) Date: May 31, 2023

(87) PCT Pub. No.: WO2022/158194
PCT Pub. Date: Jul. 28, 2022

(65) Prior Publication Data
US 2024/0007143 A1 Jan. 4, 2024

(30) Foreign Application Priority Data
Jan. 22, 2021 (EP) .................................. 21305079

(51) Int. Cl.
*H04B 1/71* (2011.01)
*H04B 1/715* (2011.01)
(Continued)

(52) U.S. Cl.
CPC ........... *H04B 1/715* (2013.01); *H04B 17/345* (2015.01); *H04B 17/391* (2015.01)

(58) Field of Classification Search
CPC ..... H04B 17/345; H04B 1/715; H04B 17/391
See application file for complete search history.

(56) References Cited

U.S. PATENT DOCUMENTS 9,490,855 B1 * 11/2016 Rimini ................. H04B 1/525
11,108,432 B2 * 8/2021 Gresset ................. H04B 1/715
(Continued)

FOREIGN PATENT DOCUMENTS

EP 3 716 506 A1 9/2020

OTHER PUBLICATIONS

International Search Report for PCT/JP2021/046655 mailed on Mar. 18, 2022.
(Continued)

*Primary Examiner* — Dac V Ha
(74) *Attorney, Agent, or Firm* — Birch, Stewart, Kolasch & Birch, LLP

(57) ABSTRACT

A method for estimating a performance of a wireless communication network for a given time-frequency resource allocation is disclosed. The communications in said wireless communication network are subject to interferences whose activation is modeled by a binary random variable $b_t$ indicating whether an interferer is active or not at a time instant t, the discrete-time stochastic process $\{b_t\}_{t \in [-\infty;+\infty]}$ being modelled by a Markov chain with memory M. A frequency channel sequence associated with at least one set of consecutive observations of interference activation is determined from a frequency hopping sequence. The Markov chain associated with the determined frequency channel sequence is then identified and a set of probabilities of the identified Markov chain is updated according to the obtained at least one set of consecutive observations of interference activation.

14 Claims, 6 Drawing Sheets

(51) Int. Cl.
    *H04B 17/345*     (2015.01)
    *H04B 17/391*     (2015.01)

(56) References Cited

U.S. PATENT DOCUMENTS

| | | | | |
|---|---|---|---|---|
| 11,665,777 | B2 * | 5/2023 | Balakrishnan | H04W 88/04 |
| | | | | 370/329 |
| 2018/0102956 | A1 * | 4/2018 | Amini | H04B 1/005 |

OTHER PUBLICATIONS

Mehta et al., "Analysis of Blocking Probability in a Relay-Based Cellular OFDMA Network", Wireless Personal Communications, Springer, Dordrecht, Netherlands, May 23, 2015, vol. 84, No. 4, pp. 2467-2492.
Written Opinion of the International Searching Authority for PCT/JP2021/046655 mailed on Mar. 18, 2022.

* cited by examiner

METHOD, DEVICE, COMPUTER PROGRAM PRODUCT, AND NON-TRANSITORY INFORMATION STORAGE MEDIUM FOR ESTIMATING PERFORMANCE OF WIRELESS COMMUNICATION NETWORK

TECHNICAL FIELD

At least one of the present embodiments generally relates to a method and a device for estimating a performance of a wireless communication network for a given time-frequency resource allocation, more particularly in the case where said communications in said wireless communication network occurs on a subset of time and frequency resources defined according to a frequency hopping sequence.

BACKGROUND ART

Wireless networks operated on CBTC systems uses public radio frequency bands. In particular, the 2.4 GHz ISM (Industrial, Scientific and Medical) frequency band has been considered for wireless networks deployed in CBTC systems. However, this band is also widely used by many radio frequency devices (e.g. WiFi hotspots, microwave equipment). Consequently, radio transmissions in CBTC wireless networks may suffer from interferences caused by such external devices. Because of such interferences, many packets sent by one end of a CBTC system may be unreceived by another end.

Yet, in some CBTC systems, at least one packet must be exchanged between both ends within a predetermined time period (typically between 1 s and 1.5 s), otherwise the CBTC system starts a train stop procedure. Since a train stop impacts the traffic of several trains, it is desirable that a train stop does not occur more than once a year, once every 10 years, or even once every 20 years.

Solutions have been developed to reduce the number of train stops in a given time frame. For example, it is known to dynamically allocate time-frequency resources according to a database of interference measurements to reduce the amount of train stops. To this aim, it is known to assess the performance of the CBTC system for a given resource allocation by estimating a metric of the wireless network based on the respective estimated distributions of the probabilities of radio transmission error during a time window. However, this metric assumes a time/frequency independency of the interference signal. Yet, this hypothesis is not valid in the case of wideband sporadic interferers such as Wi-Fi interferers.

It is thus desirable to appropriately define the metric to better assess the performance of the wireless network especially in case where the interference signals are correlated in time and frequency, e.g. in the case of wideband sporadic interferers such as Wi-Fi interferers.

SUMMARY OF INVENTION

According to a general aspect of at least one embodiment, a method for estimating a performance of a wireless communication network for a given time-frequency resource allocation is disclosed. The communications in said wireless communication network occur on a subset of time and frequency resources defined according to a frequency hopping sequence. The communications are subject to interferences whose activation is modeled by a binary random variable $b_t$ indicating whether an interferer is active or not at a time instant t, the discrete-time stochastic process $\{b_t\}_{t \in [-\infty;+\infty]}$ being modelled by a Markov chain with memory M on a finite space, M being an integer. The method comprises at least one iteration of:

- Obtaining, from a receiver, at least one set of consecutive observations of interference activation;
- Determining a frequency channel sequence associated with the at least one set of consecutive observations of interference activation from said frequency hopping sequence;
- Identifying a Markov chain associated with the determined frequency channel sequence;
- Updating a set of probabilities of the identified Markov chain according to the obtained at least one set of consecutive observations of interference activation.

The above method improves the assessment of the performance of a wireless network especially in the case of interference signals correlated in time and frequency, e.g. in the case of wideband sporadic interferers such as Wi-Fi interferers. Indeed, the learnt Markov chains allow for estimating performance of the transmission on given resources of a frequency hopping system taking into account the time/frequency correlation of interference.

In an embodiment, the method further comprises estimating a value of a metric representing the performance of said wireless communication network for a first given time-frequency resource allocation responsive to said updated set of probabilities.

In an embodiment, estimating a value of a metric representing the performance of said wireless communication network for a first given time-frequency resource allocation $\{n_t(p)\}_{p=1}^{N_p}$ from said updated set of probabilities, where Np is the number of packets to be transmitted during a given time window divided into time slots and $n_t(p)$ being an index of a time slot during which the p-th packet is transmitted comprises:

- for each interference activation configuration of at least a subset of all possible interference activation configurations $[b_{-M}, \ldots, b_{N_w-1}] \in \{0, 1\}^{N_w+M}$, $N_w+M$ being a number of time slots:
  - obtaining Np values $p(b_{n_t(p)}|b_{n_t(p)-1}, \ldots, b_{n_t(p)-M})$ from the Markov chain with memory associated with a frequency channel sequence $n_f(n_t(p)-M), \ldots, n_f(n_t(p))$ where p varies from 1 to Np, $n_f(n_t(p))$ is an index of a frequency channel used for the transmission of the p-th packet defined according to the frequency hopping sequence;
  - computing a first value as the product of the obtained Np values $p(b_{n_t(p)}|b_{n_t(p)-1}, \ldots, b_{n_t(p)-M})$;
  - obtaining a second value equal to $f(\{g(b_{n_t(p)}, n_f(n_t(p)))\}_{p=1}^{N_p})$, where $f()$ is representative of a performance of the wireless communication network at an application layer and $g(b_{n_t(p)}, n_f(n_t(p))) = b_{n_t(p)} \cdot \rho_{active, n_f(n_t(p))} + (1-b_{n_t(p)}) \cdot \rho_{inactive, n_f(n_t(p))}$, $\rho_{active, n_f(n_t(p))}$ being a signal to noise ratio measured on the frequency channel $n_f(n_t(p))$ when any interferer is active and $\rho_{inactive, n_f(n_t(p))}$ being a signal to noise ratio measured on the frequency channel $n_f(n_t(p))$ when no interferer is active;
  - computing a third value as the product of the first value and the second value; and
  - summing the third values over all interference activation configurations of the subset.

In an embodiment, computing a first value as the product of the obtained Np values $p(b_{n_t(p)}|b_{n_t(p)-1}, \ldots, b_{n_t(p)-M})$ for each interference activation configuration of a subset of all possible interference activation configurations $[b_{-M}, \ldots, b_{N_w-1}] \in \{0, 1\}^{N_w+M}$ comprises using a binary tree implementation.

In an embodiment, $f(\{g(b_{n_t(p)}, n_f(n_t(p)))\}_{p=1}^{N_p}) = \hbar_{p=1}^{N_p} P_e(g(b_{n_t(p)}, n_f(n_t(p))))$, where $P_e(\cdot)$ is a function representative of the probability of error when receiving a packet.

In an embodiment, wherein $f(\{g(b_{n_t(p)}, n_f(n_t(p)))\}_{p=1}^{N_p}) = \hbar_{p=1}^{N_p} D(g(b_{n_t(p)}, n_f(n_t(p))))$, where $D(\cdot)$ is a function representative of the number of bits that can be transmitted on a time-frequency resource.

In an embodiment, obtaining, from a receiver, at least one set of consecutive observations of interference activation comprises for at least one time slot:
- measuring an interference plus noise level;
- comparing said measured interference plus noise level with a threshold;
- deducing the presence of interference responsive to said comparison.

In an embodiment, updating a set of probabilities of the identified Markov chain according to the obtained at least one set of consecutive observations of interference activation comprises:
- adding one unit to a value storing the number of all the occurrences of an event corresponding to said at least one set of consecutive observations of interference activation;
- adding one unit to a total number of occurrences for the identified Markov chain; and
- computing the set of probabilities $p(b_t|b_{t-1}, \ldots, b_{t-M})$ responsive to these values.

In an embodiment, updating a set of probabilities of the identified Markov chain according to the obtained at least one set of consecutive observations of interference activation comprises in the case where at least one observation is in an unknown state:
- for each event corresponding to said at least one set of consecutive observations of interference activation with said at least one observation being in an unknown state, adding one unit to a value storing the number of all the occurrences of said event;
- adding one unit to a total number of occurrences for the identified Markov chain; and
- computing the set of probabilities $p(b_t|b_{t-1}, \ldots, b_{t-M})$ responsive to these values.

In an embodiment, the method further comprises estimating a value of a metric representing the performance of said wireless communication network for a second given time-frequency resource allocation responsive to said updated set of probabilities and selecting the given set of time-frequency resource allocations associated with the best metric's value.

According to a general aspect of at least one embodiment, a device configured to estimate a performance of a wireless communication network for a given time-frequency resource allocation is disclosed. The communications in said wireless communication network occur on a subset of time and frequency resources defined according to a frequency hopping sequence. The communications are subject to interferences whose activation is modeled by a binary random variable $b_t$ indicating whether an interferer is active or not at a time instant t, the discrete-time stochastic process $\{b_t\}_{t\in[-\infty;+\infty]}$ being modelled by a Markov chain with memory M on a finite space, M being an integer. The device comprises at least one processor configured to implement at least one iteration of:
- Obtaining, from a receiver, at least one set of consecutive observations of interference activation;
- Determining a frequency channel sequence associated with the at least one set of consecutive observations of interference activation from said frequency hopping sequence;
- Identifying a Markov chain associated with the determined frequency channel sequence;
- Updating a set of probabilities of the identified Markov chain according to the obtained at least one set of consecutive observations of interference activation.

In an embodiment, the processor is further configured to estimate a value of a metric representing the performance of said wireless communication network for a first given time-frequency resource allocation responsive to said updated set of probabilities.

The present invention also concerns a computer program that can be downloaded from a communication network and/or stored on a non-transitory information storage medium that comprises program code instructions that can be read and executed by a processing device, such as a microprocessor, for causing implementation of the aforementioned method in any one of its embodiments. The present invention also concerns a non-transitory information storage medium, storing such a computer program.

The characteristics of the invention will emerge more clearly from a reading of the following description of at least one example of embodiment, said description being produced with reference to the accompanying drawings.

DESCRIPTION OF EMBODIMENTS

Figure 1:
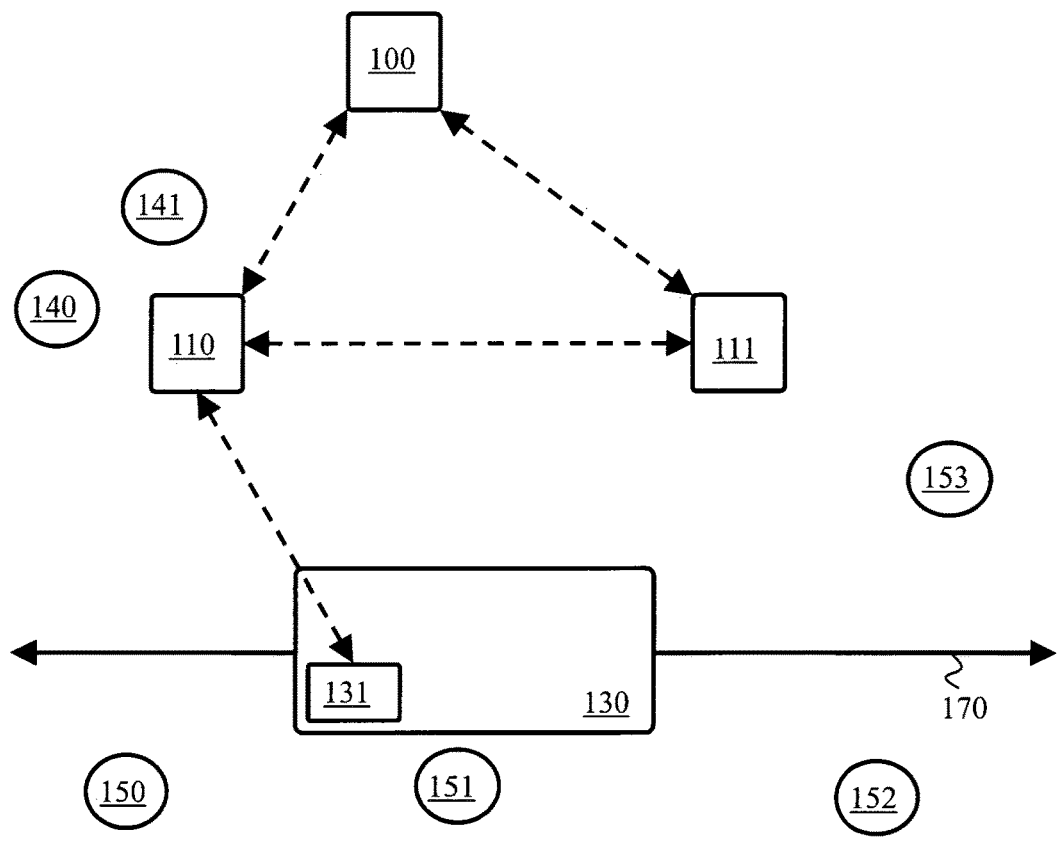
FIG. 1 schematically represents a wireless communication network in which the present invention may be implemented.

FIG. 1 schematically represents a wireless communication network, e.g. using CBTC signalling, in which the present invention may be implemented. Communications-based train control (CBTC) is a railway signalling system that makes use of communications between the train and track equipment for the traffic management and infrastructure control.

The wireless communication network comprises APs 110, 111 located along a path, i.e. the track 170 on which the train 130 is running. The invention disclosed in the context of a train may also apply to other types of vehicle such as for example a bus, the path, in this case, being a predefined route followed by the bus.

The APs 110, 111 offer services of the wireless communication network to communication devices, such as a communication device 131 located in the train 130. The communication device 131 is for instance a mobile terminal or a relay station allowing mobile terminals located in the train to access the services of the wireless communication network via the APs.

The wireless communication network may further comprise a server 100, for instance implemented in a core network implementing centralized radio resources management and/or mobility management functionalities.

The APs 110, 111 may be interconnected one with each other, thus implementing decentralized radio resources management and/or mobility management functionalities.

Static interferers 150, 151, 152, 153 may be located sufficiently close to the track 170 of the train 130 to impact the downlink communications from the APs 110, 111 to the communication device 131 located in the train 130. Such interferers 150, 151, 152, 153 are for instance Wi-Fi (registered trademark) access points, conforming to the IEEE 802.11 standards.

Other static interferers 140, 141 may be located sufficiently close to the AP 110 to impact the uplink communications from the communication device 131 located in the train 130 to the AP 110. Such interferers 140, 141 are for instance WiFi (registered trademark) access points, conforming to the IEEE 802.11 standards.

Figure 2:
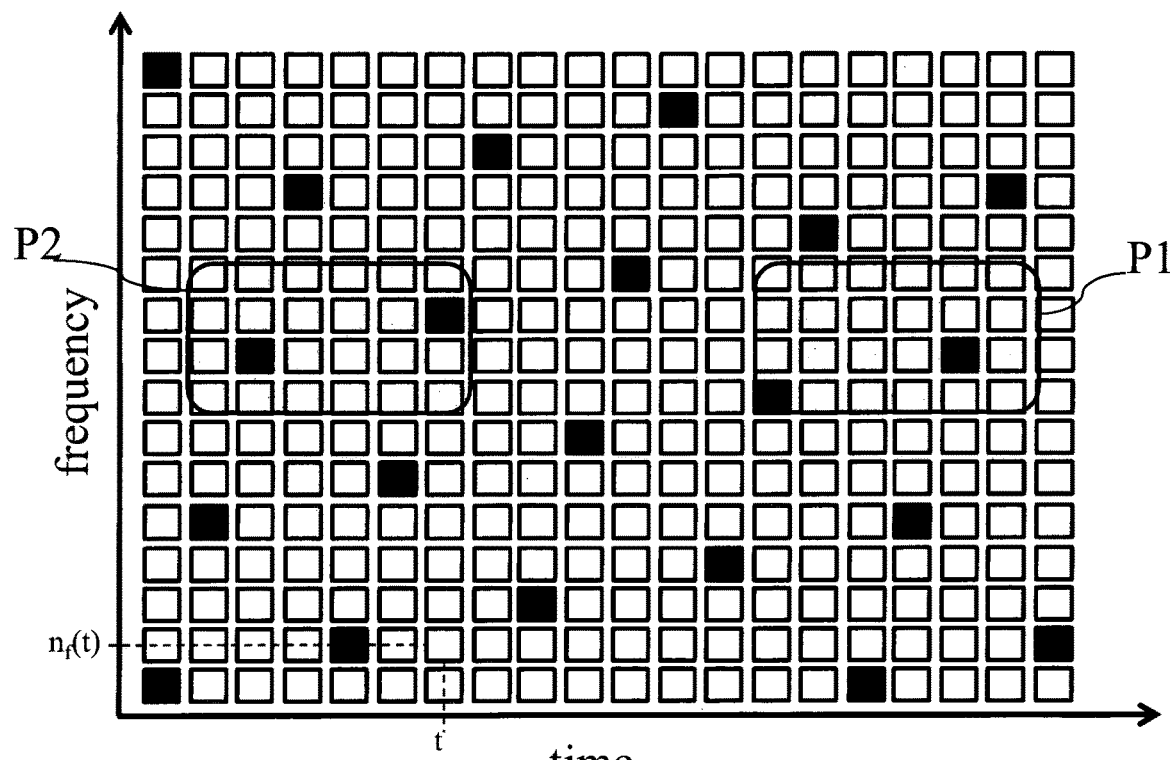
FIG. 2 illustrates the impact of wideband sporadic interferences on a frequency hopping system.

FIG. 2 illustrates the impact of wideband sporadic interferences on a frequency hopping system. On FIG. 2, the frequency band is divided into Nc frequency channels of equal size. For example, the frequency band is 80 MHz wide and is divided into 16 channel of 5 MHz each. In other words, each row of the grid shown in FIG. 2 represents a 5 MHz wide frequency band. The frequency carrier is for example around 2.4 GHz. It should be noticed that Wi-Fi interferers are the most probable users of the 2.4 GHz ISM band.

Time is divided into frame periods. Each frame period is then divided into time slots of equal size, e.g. of 4 ms. Usage of one such frequency channel during one such time slot defines one time and frequency resource.

The transmission is performed using time and frequency resources of said grid according to a frequency hopping sequence, i.e. the transmission of packets occurs on a subset of time and frequency resource defined by a periodical pattern. On FIG. 2, the black squares thus show an illustrative example of such a periodic frequency hopping sequence over a represented frame of twenty time slots. This pattern is usually a permutation of the sequential usage of all channels defined in a given frequency band. Said otherwise, the frequency hopping sequence defines a pattern usage of the frequency channels according to the time slots. A time and frequency resource is thus identified by a time slot index t and a corresponding frequency channel index $n_f(t)$. The time slots are indexed from minus infinity to plus infinity.

On FIG. 2, the gray rectangles P1 and P2 represent packets of a Wi-Fi interferer using a 20 MHz-band which corresponds to 4 adjacent 5 MHz-channels of the frequency hopping system. In the case where the packets P1 and P2 of the Wi-Fi interferers are longer in time than the typical period of time between two usage of any of the four above-mentioned adjacent channels as defined by the frequency hopping system, the same Wi-Fi packet interferes on at least two packets of the frequency hopping system transmitted in a given time window. In the case where the Wi-Fi packets are shorter but transmitted in bursts, the probability that interference occurs on at least two packets of the frequency hopping system transmitted in a given time window is high.

In order to appropriately assess the performance of a wireless communication network subject to interferers and that uses a frequency hopping system for time-frequency resource allocation, it is thus desirable to correctly model the time-frequency correlation of the interferers. To this aim, Markov chains with memory are used and learned responsive to measurements on interferences made by receivers.

The performance at an application layer is representative of a probability that at least one data packet is successfully transferred from one end to the other during a given time window. For example, the application layer relates to CBTC and at least one packet must be exchanged from one end to the other during a given time window, otherwise a train stop procedure starts. In another example, the application layer performs obstacle detection. In this specific case, enough sensor data must be sent from the train to the server to allow the detection of any obstacle in due time. In a last example, the application layer relates to CCTV (Closed-Circuit Tele Vision) and requires enough video data to be transmitted between the train and the server.

In the following, a time window starting at time index t=0 is considered that is split into $N_w$ time slots. The signal to noise ratio experienced by a receiver of a communication occurring during the $t^{th}$ time slot (and consequently on the frequency channel of index $n_f(t)$) is denoted $\rho_t$. One transmission of a data set in the considered system is split into $N_p$ packets that are transmitted on a subset of the $N_w$ time slots. The index of the time slot during which the p-th packet is transmitted is denoted $n_t(p)$. $\{n_t(p)\}_{p=1}^{N_p}$ thus denotes the set of $N_p$ indices identifying the time slots on which the packets are sent during the considered time window. Since a frequency hopping system is used, the frequency channel on which each of the Np packets is transmitted varies from one packet transmission to another. The index of the frequency channel used for transmission of the p-th packet is denoted $n_f(n_t(p))$ In a specific embodiment, the activation of interferers is modeled by a binary random variable $b_t$ indicating whether an interferer is active or not at a time instant t. The discrete-time stochastic process $\{b_t\}_{t \in [-\infty;+\infty]}$ can be approximatively modeled by a Markov chain with memory M defined on a finite space, M being an integer. With a high value of M, typically between 10 and 20, the discrete-time stochastic process $\{b_t\}_{t \in [-\infty;+\infty]}$ is well approximated. The performance of the wireless communication network for a given time-frequency resource allocation $\{n_t(p)\}_{p=1}^{N_p}$ is assessed by estimating the following metric:

$$\hat{f}\left(\{n_t(p)\}_{p=1}^{N_p}\right) = \sum_{[b_{-M}, \ldots, b_{N_w-1}] \in \{0,1\}^{N_w+M}} \left[\left(\prod_{p=1}^{N_p} p(b_{n_t(p)} | b_{n_t(p)-1}, \ldots, b_{n_t(p)-M})\right)\right] \quad \text{(Eq.1)}$$

$$f\left(\{\rho_{n_t(p), n_f(n_t(p))}\}_{p=1}^{N_p}\right) = \sum_{[b_{-M}, \ldots, b_{N_w-1}] \in \{0,1\}^{N_w+M}} \left[\left(\prod_{p=1}^{N_p} p(b_{n_t(p)} | b_{n_t(p)-1}, \ldots, b_{n_t(p)-M})\right) f\left(\{g(b_{n_t(p)}, n_f(n_t(p)))\}_{p=1}^{N_p}\right)\right]$$

where:

$\rho_{n_t(p), n_f(n_t(p))}$ is a signal to noise ratio experienced during the time slot $n_t(p)$ and on the frequency channel $n_f(n_t(p))$, that relates to the random variable $b_t$ and is defined as follows:

$$\rho_{n_t(p),n_f(n_t(p))} = \quad (Eq.2)$$

$$g(b_{n_t(p)},n_f(n_t(p))) = b_{n_t(p)} \cdot \rho_{active,n_f(n_t(p))} + (1 - b_{n_t(p)}) \cdot \rho_{inactive,n_f(n_t(p))}$$

where $\rho_{active,n}$ is a reference signal to noise ratio observed when any interferer is active on frequency channel n, and $\rho_{inactive,n}$ is a reference signal to noise ratio observed when no interferer is active on frequency channel n, and wherein $\rho_{active,n_f(t)}$ and $\rho_{inactive,n_f(t)}$ do not depend on the time t.

In a variant, $\rho_{active,n_f(t)}$ and $\rho_{inactive,n_f(t)}$ further depend on the time t. This may be the case if the receiver or the transmitter is moving. In this variant, a fingerprint database of signal to noise ratio or a prediction algorithm may be used to get $\rho_{active,n_f(t)}$ and $\rho_{inactive,n_f(t)}$ for each time index t. Such a fingerprint database stores data related to such signal to noise ratios for each frequency channel index and regions of space associated with region of space indexes. Thus, it is possible to obtain the two values of $\rho_{active,n_f(t)}$ and $\rho_{inactive,n_f(t)}$ from the train trajectory and the frequency hopping sequence. Indeed, for a given time t, the frequency hopping sequence provides the frequency channel index $n_f(t)$; and the train trajectory provides the train position which allows to compute the index of the region of space to which the position belongs. The two values of $\rho_{active,n_f(t)}$ and $\rho_{inactive,n_f(t)}$ are read in the database entries associated with the frequency channel index $n_f(t)$ and the region of space index.

The function $f(\{\rho_{n_t(p),n_f(n_t(p))}\}_{p=1}^{N_p})$ is for example defined as $\hbar_{p=1}^{N_p} P_e(\rho_{n_t(p),n_f(n_t(p))})$, where $P_e(\cdot)$ is a function representative of the probability of error when receiving a packet. Thus, this function represents the probability that no packet is successfully received among the $N_p$ packets transmitted during the considered time window. In a variant, $f(\ )$ is defined as $\Sigma_{p=1}^{N_p} D(\rho_{n_t(p),n_f(n_t(p))})$, where $D(\cdot)$ is a function representative of the number of bits that can be transmitted on the time-frequency resource. The probability $p(b_{n_t(p)}|b_{n_t(p)-1}, \ldots, b_{n_t(p)-M})$ inherently carries the structure of the frequency hopping system. In other words, the time slots $n_t(p)-M$ to $n_t(p)$ are associated with frequency channels $n_f(n_t(p)-M), \ldots, n_f(n_t(p))$ according to the frequency hopping sequence. Thus, the function $f(\ )$ relates to the performance of the wireless communication network at an application layer.

In order to estimate the metric defined by (Eq. 1), it is desirable to learn the Markov chains to get the probabilities $p(b_{n_t(p)}|b_{n_t(p)}, \ldots, b_{n_t(p)-M})$.

Figure 3:
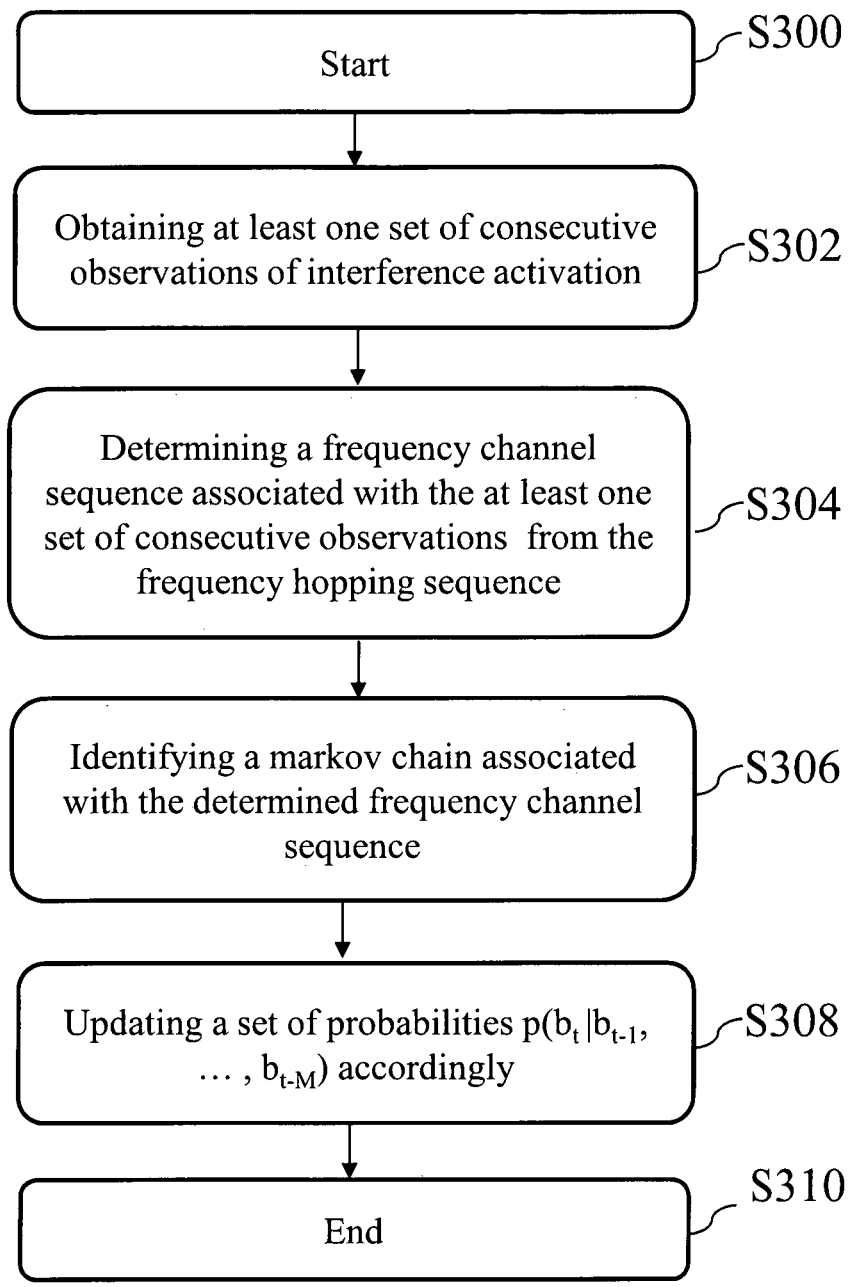
FIG. 3 depicts a flowchart of a method for learning Markov chains with memory according to a first embodiment.

FIG. 3 depicts a flowchart of a method for learning Markov chains with memory according to a first embodiment. The communications in said wireless communication network occurs on a subset of time and frequency resources defined according to a periodical frequency hopping sequence. The frequency hopping sequence has a periodicity of $T_{FH}$. In this first embodiment, the receivers are able to make measurements on the interference on all time slots following the frequency channel usage as predetermined by the frequency hopping sequence.

The method starts at S300.

At S302, at least one set of consecutive observations of interference activation $b_{t-M}, \ldots, b_t$ is obtained. In one specific embodiment, the consecutive observations of interference activation are obtained from a receiver. Indeed, the receiver is able to make measurements on the interference at all time slots following the frequency channel usage as predetermined by the frequency hopping sequence. From the measurements, the receiver is able to determine, for each time slot t, an observation $b_t$ of interference activation for example by applying a threshold on the measured interference plus noise level to convert it into a binary observation (presence of interference/no presence of interference). In the case where the interference plus noise level is above the threshold, interference is considered to be present and in the case where the interference plus noise level is below the threshold no interference is considered to be present.

At S304, a frequency channel sequence $n_f(t-M), \ldots, n_f(t)$ associated with the at least one set of consecutive observations of interference activation $b_{t-M}, \ldots, b_t$ is determined from the frequency hopping sequence. Let $n_{MC}$ be the number of distinct M+1-uple of frequency channel sequences $n_f(t-M), \ldots, n_f(t)$ resulting from the frequency hopping sequence. Each frequency channel sequence $n_f(t-M), \ldots, n_f(t)$ is associated with a Markov chain with memory since each sequence models a specific configuration of time/frequency correlation of interference. Thus, $n_{MC}$ Markov chains with memory are defined, where $2 \leq n_{MC} \leq T_{FH}$. Each Markov chain with memory is associated with a set of probabilities $p(b_t|b_{t-1}, \ldots, b_{t-M})$. $n_{MC}$ is calculated in advance based on the frequency hopping sequence. At S306, a Markov chain with memory (among the $n_{MC}$ Markov chains) that is associated with the frequency channel sequence determined at S304 is identified.

At S308, a set of probabilities $p(b_t|b_{t-1}, \ldots, b_{t-M})$ of the identified Markov chain are updated accordingly. As an example, in a specific implementation, each Markov chain with memory is implemented by using a vector with $2^{M+1}$ entries, each entry index corresponding to a given configuration of the interference activation $b_{t-M}, \ldots, b_t$ and storing the estimated probability $p(b_t|b_{t-1}, \ldots, b_{t-M})$. In this case, the row of the vector associated with the identified Markov chain corresponding to the set of consecutive observations of interference activation $b_{t-M}, \ldots, b_t$ obtained at S302 is identified and updated. Updating comprises adding one unit to a value storing the number of all the occurrences of such event since the beginning of the learning process, adding one unit to the total number of occurrences for the given Markov chain with memory, and computing $p(b_t|b_{t-1}, \ldots, b_{t-M})$ by dividing these two values. At the beginning of the learning method, the probabilities are initialized to 0 or $1/2^{M+1}$ and the number of occurrences is initialized to 0. As an example in the case where M=1, a vector X=(X1, X2, X3, X4) is stored, where X1=$p(b_t=0|b_{t-1}=0)$, X2=$p(b_t=0|b_{t-1}=1)$, X3=$p(b_t=1|b_{t-1}=0)$ and X4=$p(b_t=1|b_{t-1}=1)$. In the case where the set of consecutive observations of interference activation $b_{t-1}=1$ and $b_t=0$ is obtained at S302, X2 is updated. To this aim, one unit is added to the value storing the number of occurrences of the event ($b_{t-1}=1, b_t=0$) since the beginning of the learning process, one unit is added to the total number of occurrences for the given Markov chain with memory, and finally all $p(b_t|b_{t-1}, \ldots, b_{t-M})$ are computed by dividing the number of occurrences of the event by the total number of occurrences.

As an example, $$X2 = p(b_t = 0|b_{t-1} = 1) = \frac{\text{Nb\_occurrence}(b_t = 0, b_{t-1} = 1)}{\text{Total\_Nb\_occurences}}$$

Since the value of Total_Nb_occurences is incremented by one, all the other probabilities, i.e. X1, X3 and X4, are also updated to take into account the new value Total_Nb_occurences.

In a variant, an exponential smoothing function is used (if V is a stored value, it is updated with a new value v by replacing V by V×(1−μ)+v×μ, where μ is a parameter typically small). In this case, the value stored in the identified row is updated using the new value v=1 while the other rows are updated using the new value v=0. This allows not to store the total number of occurrences and avoid making divisions. A normalization of the rows is then necessary before usage of the probabilities since they must sum up to one.

The method ends at step S310.

The method of FIG. 3 may be implemented in a transmitter, e.g. in the APs 110, 111, in the server 100, or in a receiver, e.g. in the communication device 131. As an example, the receiver may obtain and transmit the at least one set of consecutive observations of interference activation $b_{t-M}, \ldots, b_t$ to the transmitter that is in charge on updating the Markov chains. In a variant, the receiver obtains the at least one set of consecutive observations of interference activation $b_{t-M}, \ldots, b_t$, updates the Markov chains and transmits the updated Markov chains to the transmitter.

Figure 4:
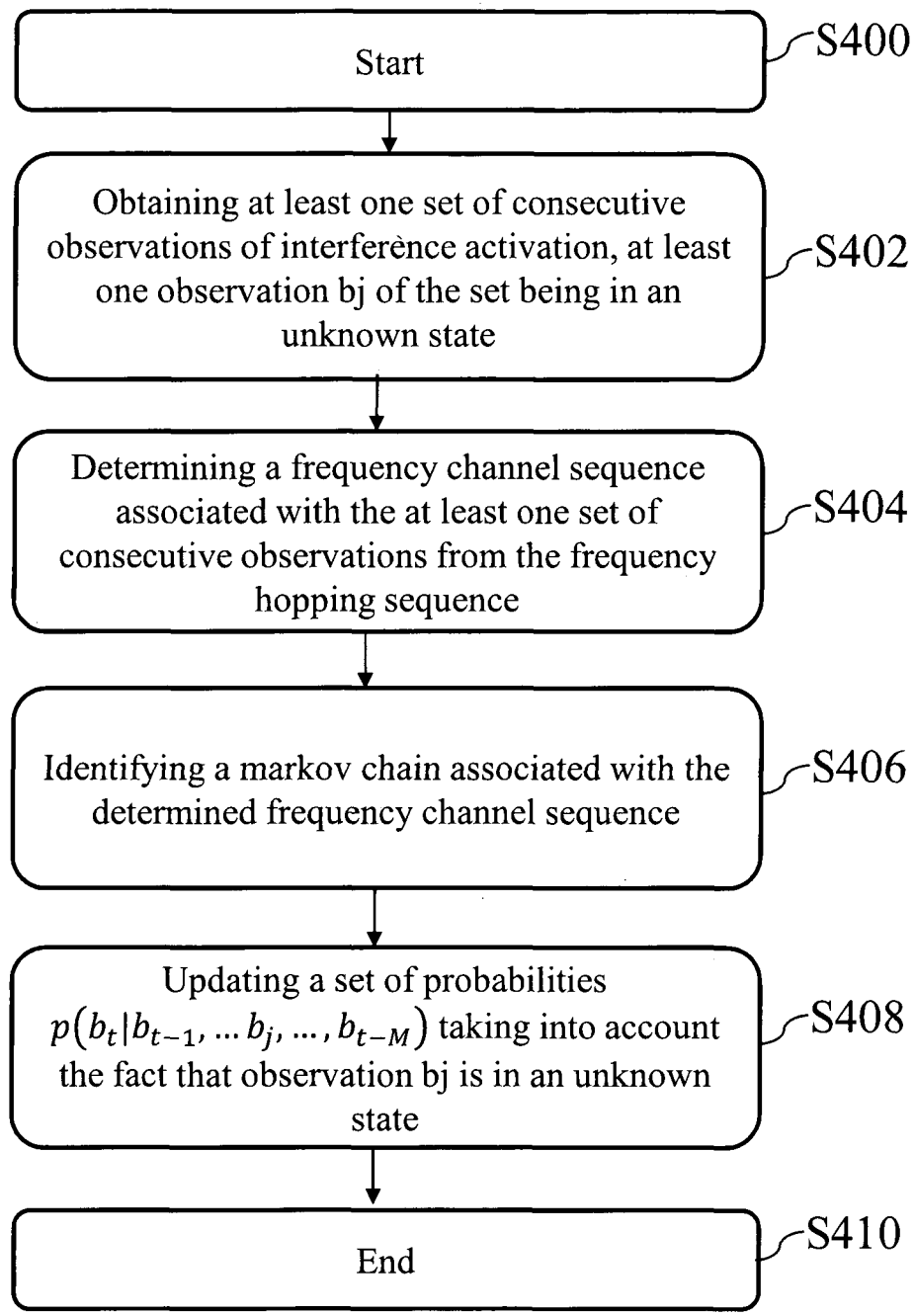
FIG. 4 depicts a flowchart of a method for learning Markov chains with memory according to a second embodiment.

FIG. 4 depicts a flowchart of a method for learning Markov chains with memory according to a second embodiment. The communications in said wireless communication network occurs on a subset of time and frequency resources defined according to a periodical frequency hopping sequence. The frequency hopping sequence has a periodicity of $T_{FH}$. The method may be implemented in a transmitter, e.g. in the APs 110, 111, in the server 100, or in a receiver, e.g. in the communication device 131. At the beginning of the method the probabilities are initialized to 0 or $1/2^{M+1}$ and the number of occurrences is initialized to 0. In this embodiment, the receivers are not able to make measurements on the interference on all time slots of the $N_w$ time slots of the considered time window. Indeed, the receiver may switch off during some time slots, e.g. to save energy or to switch into transmit mode. In this case, the interference activation $b_{t-M}, \ldots, b_t$ may not be uniquely defined because some information is missing, i.e. some values among $b_{t-M}, \ldots, b_t$ may be in an unknown state.

The method starts at S400.

At S402, at least one set of consecutive observations of interference activation $b_{t-M}, \ldots, b_j, \ldots, b_t$ is obtained, wherein at least one observation $b_j$ of the set is in an unknown state. Being in an unknown state means that it is unknown whether the value of $b_j$ is 0 or 1. In one specific embodiment, the consecutive observations of interference activation are obtained from a receiver. Indeed, the receiver is able to make measurements on the interference at least some time slots following the frequency channel usage as predetermined by the frequency hopping sequence. From the measurements, the receiver is able to determine, for at least some time slots, e.g. for each time slot except the $j^{th}$ time slot, an observation of interference activation. For example, the receiver determines the observation of interference activation $b_t$ by applying a threshold on the measured interference plus noise level to convert it into a binary observation (presence of interference/no presence of interference). In the case where the interference plus noise level is above the threshold, interference is considered to be present and in the case where the interference plus noise level is below the threshold no interference is considered to be present.

At S404, a frequency channel sequence $n_f(t-M), \ldots, n_f(t)$ associated with the at least one set of consecutive observations of interference activation $b_{t-M}^-, \ldots, b_t$ is determined from the frequency hopping sequence. Each frequency channel sequence $n_f(t-M), \ldots, n_f(t)$ is associated with a Markov chain with memory since each sequence characterizes a specific configuration of time/frequency correlation of interference. Thus, $n_{MC}$ Markov chains with memory are defined, where $2 \leq n_{MC} \leq T_{FH}$. Each Markov chain with memory is associated with a set of probabilities $p(b_t|b_{t-1}, \ldots, b_{t-M})$.

At S406, a Markov chain with memory (among the $n_{MC}$ Markov chains with $2 \leq n_{MC} \leq T_{FH}$) that is associated with the frequency channel sequence determined at S404 is identified.

At S408, a set of probabilities $p(b_t|b_{t-1}, \ldots, b_{t-M})$ of the identified Markov chain are updated taking into account the fact that $b_j$ is in an unknown state. As an example, in a specific implementation, each Markov chain with memory is implemented by using a vector (also called main vector) with $2^{M+1}$ entries, each entry index corresponding to a given configuration of the interference activation $b_{t-M}, \ldots, b_t$ and storing the estimated probability $p(b_t|b_{t-1}, \ldots, b_{t-M})$ In this case, the rows of the vector associated with the identified Markov chain compatible with the set of consecutive observations of interference activation $b_{t-M}, \ldots, b_j, \ldots, b_t$ obtained at S402 are identified and updated. In the case where only one observation $b_j$ is unknown, two rows $p(b_t|b_{t-1}, \ldots, b_j=0, \ldots b_{t-M})$ and $p(b_t|b_{t-1}, \ldots, b_j=1, \ldots b_{t-M})$ are updated. Updating comprises, for each of the above events, adding one unit to a value storing the number of all the occurrences of the given above event since the beginning of the learning process, adding one unit to the total number of occurrences for the given Markov chain with memory, and computing the two probabilities by dividing these two values.

Since the total number of occurrences for the given Markov chain with memory is incremented by one, all the other probabilities are also updated.

The method ends at step S410.

In the method disclosed with respect to FIG. 4, a single observation $b_j$ is in an unknown state. The present principles may be extended to more than one unknown observation.

In a specific embodiment, only a subset of the interference activation configurations is considered relevant, namely those with a relevant contribution to the metric in (Eq. 1). Taking into account only these relevant interference activation configurations makes it possible to reduce the complexity and memory usage. For example, an interference activation configuration $b_{t-M}, \ldots, b_t$ associated with an identified Markov chain with memory is not considered relevant in the case where:

a) $g(b_{n_f(p)}, n_f(n_t(p)))$ is above a given threshold, for example 10 dB. Indeed, in this case the signal to noise ratio is so high that it has a low impact on the error rate. Therefore, the value $g(b_{n_f(p)}, n_f(n_t(p)))$ or more precisely, $p_{active,n_f(n_t(p))}$ and $p_{inactive,n_f(n_t(p))}$ used to computed $g(b_{n_f(p)}, n_f(n_t(p)))$ are not stored; or b) $p(b_t|b_{t-1}, \ldots, b_{t-M})$ is below a given threshold, for example $10^{-5}$.

Indeed, in this case, the interference activation configuration $b_{t-M}, \ldots, b_t$ has no impact on the final value of the metric in (Eq. 1) even in the worst case where all the other terms take a maximum value. Therefore, the probability $p(b_t|b_{t-1}, \ldots, b_{t-M})$ is not stored in this case.

However, an interference activation configuration $b_{t-M}, \ldots, b_t$ not considered relevant at some point in time may become relevant in the future, for example responsive to new measurements. Thus, in a variant, the interference activation configuration is added as an entry in a temporary vector. The associated probability $p(b_t|b_{t-1}, \ldots, b_{t-M})$ of the identified Markov chain is updated as for the main vector of the identified Markov chain with memory during a predefined amount of time or for a predefined number of observations of the interference activation configuration. Finally, the probability $p(b_t|b_{t-1}, \ldots, b_{t-M})$ is inserted in the main vector if it does not verify the above-mentioned condition b).

Figure 5:
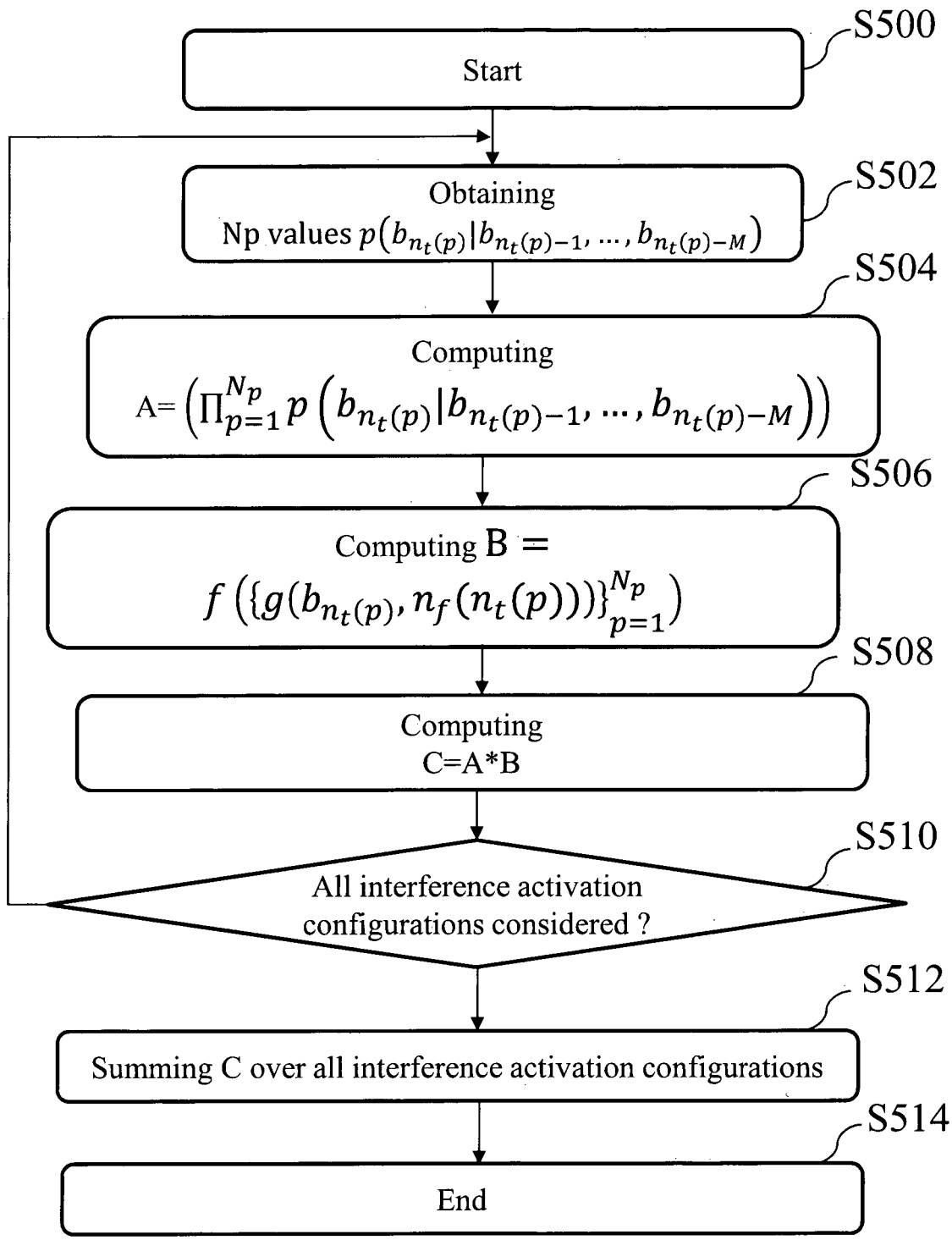
FIG. 5 depicts a flowchart of a method estimating the performance of a wireless communication network according to an embodiment.

FIG. 5 depicts a flowchart of a method estimating the performance of a wireless communication network for a given time-frequency resource allocation $\{n_t(p)\}_{p=1}^{N_p}$ according to an embodiment. From the learned Markov chains, it is possible to compute the estimated metric defined by (Eq. 1).

The method starts at S500 with a given interference activation configuration $[b_{-M}, \ldots, b_{N_w-1}] \in \{0, 1\}^{N_w+M}$.

At S502, Np probability values $p(b_{n_t(p)}|b_{n_t(p)-1}, \ldots, b_{n_t(p)-M})$ are obtained from the stored Markov chain with memory associated with the frequency channel sequence $n_f(n_t(p)-M), \ldots, n_f(n_t(p))$ with p varying from 1 to Np.

At S504, the following product is computed:

$$A = (\hbar_{p=1}^{N_p} p(b_{n_t(p)}|b_{n_t(p)-1}, \ldots, b_{n_t(p)-M})$$

At S506, for all p between one and $N_p$, the values $g(b_{n_t(p)}, n_f(n_t(p)))$ are obtained. These values $g(b_{n_t(p)}, n_f(n_t(p)))$ are obtained, as previously disclosed in (Eq. 2), from the signal to noise ratios $\rho_{active,n_f(t)}$ and $\rho_{inactive,n_f(t)}$ that are either measured or read from a database. Then, the value $B = f(\{g(b_{n_t(p)}, n_f(n_t(p)))\}_{p=1}^{N_p})$ is computed. In an example, $B = \hbar_{p=1}^{N_p} \rho_e (\rho_{n_t(p),n_f(n_t(p))})$. In another example, $B = \Sigma_{p=1}^{N_p} D (\rho_{n_t(p),n_f(n_t(p))})$.

At S508, the product C=A*B is computed for the given interference activation configuration.

The steps S502 to S508 are repeated until all interference activation configurations $[b_{-M}, \ldots, b_{N_w-1}] \in \{0, 1\}^{N_w+M}$ are considered (S510). Each time the method runs through S502, a new interference activation configuration is considered among the $2^{(N_w+M)}$ interference activation configurations.

At S512, C is summed over all interference activation configurations.

The method ends at S514.

In a variant, only a subset of all interference activation configurations is considered. Indeed, the list of all interference activation configurations can be restricted to $[b_{\Omega(1)}, \ldots, b_{\Omega(|\Omega|)}] \in \{0, 1\}^{|\Omega|}$ where the set $\Omega$ defined as $$\Omega = \bigcup_{1 \le p \le N_p} [n_t(p) - M, \ldots, n_t(p)]$$

In other words, the index a belongs to $\Omega$ if and only if there exists a p in $[1, N_p]$ and a m in $[0, M]$ such that $a = n_t(p) - m$. As a result, the maximum cardinality $|\Omega|$ of $\Omega$ is $(M+1)N_p$ when all index sets $[n_t(p)-M, \ldots, n_t(p)]$ are disjoints, and its minimum value is $M+N_p$ when the $n_t(p)$ time index are successive integers (They cannot be equal since they correspond to different packet transmission time).

Only $|\Omega|$ indices of time slots within the considered time window plus memory M are actually useful for the computation of the metric's value. Therefore, the list of interference activation configurations may be restricted to $[b_{\Omega(1)}, \ldots, b_{\Omega(|\Omega|)}] \in \{0, 1\}^{|\Omega|}$ that is a subset of all possible interference activation configurations.

In this case, the steps S502 to S508 are repeated until all interference activation configurations in the subset are considered (S510). In this variant, at S512, C is summed over all interference activation configurations of the subset.

Figure 6:
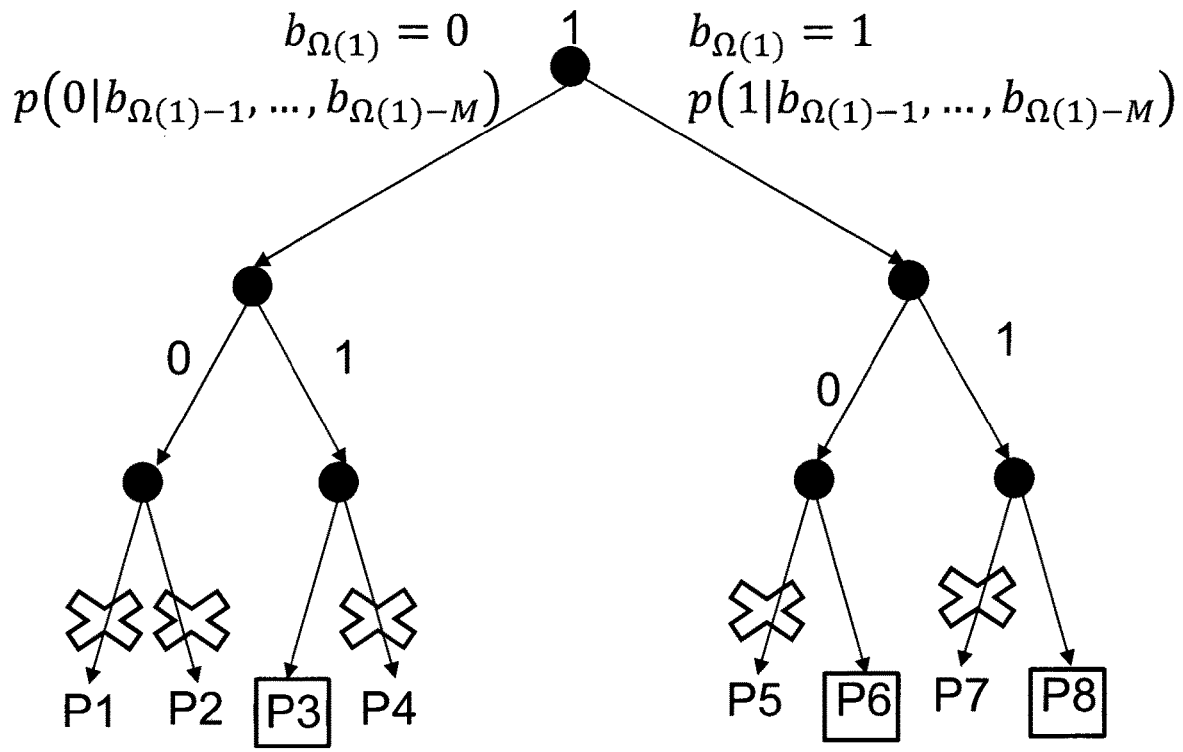
FIG. 6 depicts a binary tree used for the selection of most relevant conditional probabilities according to one embodiment.

In a specific embodiment, the most relevant probabilities $p(b_t|b_{t-1}, \ldots, b_{t-M})$ are selected using a binary tree implementation as depicted on FIG. 6. This makes it possible to reduce the complexity of the calculation of the metric of (Eq. 1). Indeed, the list of all interference activation configurations can be seen as a binary tree on $[b_{\Omega(1)}, \ldots, b_{\Omega(|\Omega|)}] \in \{0, 1\}^{|\Omega|}$, each leaf (i.e. end of tree branch) being associated with $(\hbar_{p=1}^{N_p} p(b_{n_t(p)}|b_{n_t(p)-1}, \ldots, b_{n_t(p)-M}))$.

Starting from a root node of the binary tree, carrying an initial probability value "1", two branches are generated for $b_{\Omega(1)}=0$ and $b_{\Omega(1)}=1$. Each child node thus generated is associated with a probability $p(b_{\Omega(1)}|b_{\Omega(1)-1}, \ldots, b_{\Omega(1)-M})$. This operation is repeated recursively as follow. From all the branches determined in a depth k−1 corresponding to $b_{\Omega(k-1)}$, two additional branches are generated for $b_{\Omega(k)}=0$ and $b_{\Omega(k)}=1$. After each repetition of this operation, it is checked whether there exists pcurrent such that $\Omega(k) = n_t$ (pcurrent). If not, the value carried by the parent node resulting from the depth k−1 is associated with the corresponding two child nodes. If this is the case, the probability $p(b_{n_t(pcurrent)}|b_{n_t(pcurrent)-1}, \ldots, b_{n_t(pcurrent)-M})$ is read from the Markov chain with memory associated with the frequency channel sequence $n_f(n_t (\text{pcurrent})-M), \ldots, n_f(n_t (\text{pcurrent}))$ and interference activation configuration $b_{n_t(pcurrent)-M}, \ldots, b_{n_t(pcurrent)}$.

The read value is multiplied by the value carried by the parent node resulting from the depth k−1 and the value resulting from this multiplication is associated with the corresponding child node. If, for each new child node, this value (i.e. $\hbar_{p=1}^{pcurrent} p(b_{n_t(p)}|b_{n_t(p)-1}, \ldots, b_{n_t(p)-M})$) is below a given threshold (e.g. P1, P2, P4, P5 and P7 on FIG. 6), the branch is not continued and thus cut. On FIG. 6, the branches corresponding to P1, P2, P4, P5 and P7 are cut while the branches corresponding to P3, P6 and P8 are continued. At the end, only the values of $\hbar_{p=1}^{N_p} p(b_{n_t(p)}|b_{n_t(p)-1}, \ldots, b_{n_t(p)-M})$ that are associated with the leaves of the tree and that are above a given threshold remain. Therefore, these values are computed in an efficient manner that keeps memory and computational resource reasonable.

In a variant, instead of cutting branches via thresholding, only a predetermined number of branches, e.g. 20, corresponding to the best values associated with new children nodes is kept at each step.

Thresholding $\hbar_{p=1}^{N_p} p(b_{n_t(p)}|b_{n_t(p)-1}, \ldots, b_{n_t(p)-M})$ makes it possible to limit complexity, but if the remaining branches are finally attached to a small value $f(\{g(b_{n_t(p)}), n_f(n_t(p))\}_{p=1}^{N_p})$, it would be better to discard the associated branch earlier. However, with a generic form of $f(\cdot)$, all the values of $b_{n_t(p)}$ are needed for its computation, and no branch can be cut that is involved in the evaluation of $f(\cdot)$. Therefore, in another embodiment, the procedure described above is applied to $(\hbar_{p=1}^{N_p} p(b_{n_t(p)}|b_{n_t(p)-1}, \ldots, b_{n_t(p)-M})) f(\{g(b_{n_t(p)}, n_f(n_t(p)))\}_{p=1}^{N_p})$ in the case where $f(\cdot)$ can be decomposed as follows:

$$f(\cdot) = \prod_{p=1}^{N_p} f_p\left(g(b_{n_t(p)}, n_f(n_t(p)))\right)$$

The inner terms of the sum in (Eq. 1) can be written as $(\hbar_{p=1}^{N_p} p(b_{n_t(p)}|b_{n_t(p)-1}, \ldots, b_{n_t(p)-M}) f_p(g(b_{n_t(p)}, n_f(n_t(p)))))$. In this case, the list of all interference activation configurations can be seen as a binary tree on $[b_{\Omega(1)}, \ldots,$ $b_{\Omega(|\Omega|)}] \in \{0,1\}^{|\Omega|}$, each leaf (i.e. end of tree branch) being associated with $(\hbar_{p=1}^{N_p} p(b_{n_t(p)}|b_{n_t(p)-1}, \ldots, b_{n_t(p)-M}) f_p (g(b_{n_t(p)}, n_f(n_t(p)))))$.

Consequently, instead of applying the thresholding procedure detailed above to $\hbar_{p=1}^{pcurrent} p(b_{n_t(p)}|b_{n_t(p)-1}, \ldots, b_{n_t(p)-M})$, pcurrent being the current depth, it is directly applied to $$(\hbar_{p=1}^{pcurrent} pp(b_{n_t(p)}|b_{n_t(p)-1}, \ldots, b_{n_t(p)-M}) f_p(g(b_{n_t(p)}, n_f(n_t(p)))))$$

by defining a threshold to cut some branches, or by saving only predetermined number of branches corresponding to the best values at each step.

The $f(\{n_t(p)\}_{p=1}^{N_p}) = \hbar_{p=1}^{N_p} P_e(\rho_{n_t(p)})$ verifies the above property with $f_p(x) = P_e(x)$ and $\rho_{n_t(p), n_f(n_t(p))} = g(b_{n_t(p)}, n_f(n_t(p)))$.

The learned Markov chains and consequently the estimated metric defined by (Eq. 1) may be used in several applications, e.g. resource allocation.

Figure 7:
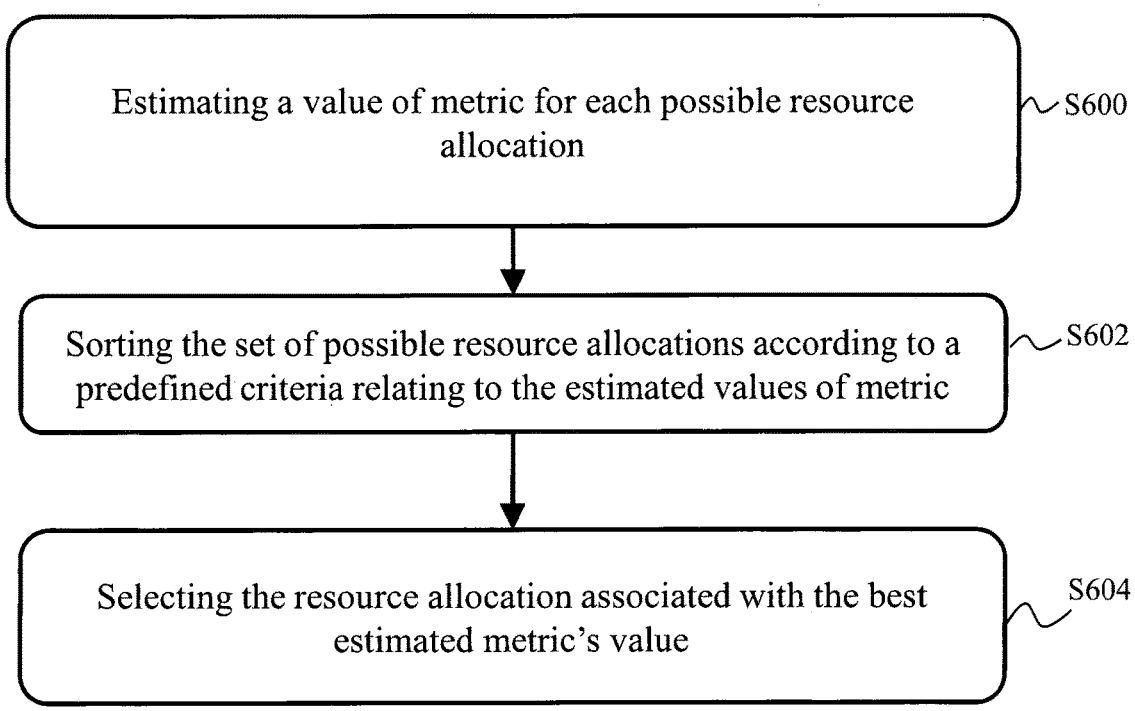
FIG. 7 depicts a flowchart of a resource allocation method in a wireless communication network according to an embodiment.

FIG. 7 depicts a flowchart of a resource allocation method in a wireless communication network according to an embodiment.

In a step S600, the transmitter 100 estimates a metric's value for each possible resource allocation, i.e., for several configurations of the set $\{n_t(p)\}_{p=1}^{N_p}$. As an example, the transmitter has a codebook of predetermined resource allocation.

In an optional step S602, the transmitter 100 sorts the possible resource allocations according to a predefined criterion, i.e. in increasing (or decreasing depending on whether the metric's value is to be maximized or minimized) order of the estimated metric values. Sorting the possible resource allocations facilitate the execution of a following step S604.

In a step S604, the transmitter 100 selects the resource allocation associated with the best estimated metric's value. The best metric value may be the highest or the lowest estimated metric's value depending on whether the metric's value is to be maximized or minimized. In the case where $f(\ )$ is defined from $Pe(\cdot)$, then the metric's value is to be minimized while in the case where $f(\ )$ is defined from $D(\cdot)$, then the metric's value is to be maximized.

In another specific embodiment, a set of Markov chains is stored for each geographical area of a given set of geographical areas in a database. In this case, a feedback from a first receiver, e.g. a first train, may be used to update these stored Markov chains, the updated Markov chains being used for resource allocation of a second receiver, e.g. a second train, crossing the same geographical area at a later time. More precisely, the measurements on the interference made in the first receiver are transmitted to the database which updates the stored Markov chains based on the transmitted measurements. In a variant, new Markov chains are computed in the first receiver and transmitted to the database. The database receiving the new Markov chain either replaces the former stored Markov chains with the new ones or combines them. Indeed, in the case where the receivers are moving, the feedback may be too long, i.e. the receiver's condition may have drastically changed between the time the measurements are done and the time the Markov chains are updated. Storing, in a database, a set of Markov chains per geographical area makes it possible solves this problem.

In another specific embodiment, resource allocation is performed according to an online scheduling technique. In this case, several receivers may be in communication with the transmitter. The transmitter has to decide to which receiver to allocate a next time slot according to the past allocations. In this case, an implementation using a K best tree computation may be used as it is easy to start from the last status of remaining branches and compute the estimated metric corresponding to allocating the new resource to each one of the receivers, deciding to which user the resource must be allocated by maximizing the minimum value among the receivers. More precisely, the $N_p-1$ previous resource allocations $n_t(P), \ldots, n_t(N_p-1)$ associated with the considered receiver are recovered, and it is assumed that the next time resource $n_t(N_p)$ is allocated for a transmission towards said receiver. Thus, it is possible to compute Eq. 1 and storing the metric $\hat{f}(\{n_t(p)\}_{p=1}^{N_p})$ associated with said receiver. The operation is repeated for each receiver. The implementation complexity can be reduced by using a K best tree computation for each receiver in parallel. After the computation of the metric for each receiver, the current resource is allocated to the receiver exhibiting the best metric. The sets $n_t(p), \ldots, n_t(N_p-1)$ are updated accordingly.

In a variant, the estimated metric values computed from Markov Chains is only used in some specific configurations. In an example, a transmitter estimates a first metric's value classically, i.e. without using Markov chain with memory. This first estimated metric's value is transmitted to a receiver. The receiver learns the Markov chains, e.g. using the method disclosed with respect to FIG. 3 or 4, and estimates a second metric's value from these Markov chains, e.g. using the method disclosed with respect to FIG. 5. In the case where the absolute difference between the first and second estimated metric's values is above a threshold, the receiver informs the transmitter to use these Markov chains in order to estimate a metric's value. To this aim, the receiver may transmit the learned Markov chains to the transmitter in order to improve resource allocation. Otherwise, i.e. the difference between the two estimated metric's values is below the threshold, the metric's value is estimated classically. In this variant, the learned Markov chains are only used in some specific cases where it is beneficial to use them which makes it possible to decrease the overall complexity.

The estimated metrics may be used for other applications such as for monitoring radio conditions in a CBTC radio environment. Such monitoring can be used to provide a prediction of train stop events and thus cope in advance with undesirable situations. In another embodiment, the estimated metric may be used to estimate the performance of a virtual deployment of receivers.

Figure 8:
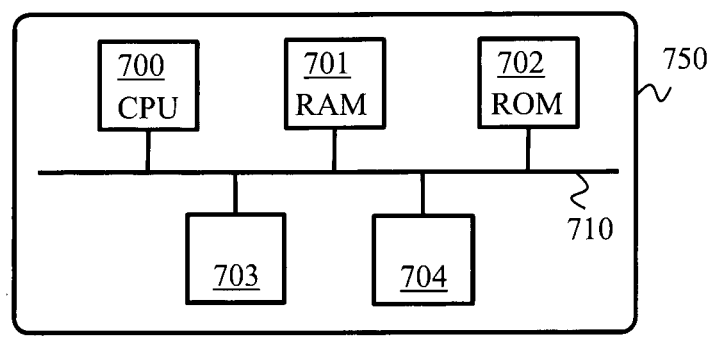
FIG. 8 schematically represents a communication device of the wireless communication network according to an embodiment.

FIG. 8 schematically represents a communication device 750 of the wireless communication network according to an embodiment. The communication device 750 may be a representation of an AP, such as the AP 110, and/or may be a representation of a communication device, such as the communication device 131, and/or may be a representation of the server 100.

According to the shown architecture, the communication device 750 comprises the following components interconnected by a communications bus 710: a processor, microprocessor, microcontroller or CPU (Central Processing Unit) 700; a RAM (Random-Access Memory) 701; a ROM (Read-Only Memory) 702; an HDD (Hard-Disk Drive) or an SD (Secure Digital) card reader 703, or any other device adapted to read information stored on storage means; and, a set of at least one communication interface 704.

The set of at least one communication interface 704 allows the communication device 750 to communicate with at least one other communication device of the wireless communication network.

CPU 700 is capable of executing instructions loaded into RAM 701 from ROM 702 or from an external memory, such as an SD card. After the communication device 750 has been powered on, CPU 700 is capable of reading instructions from RAM 701 and executing these instructions. The instructions form one computer program that causes CPU 700, and thus the communication device 750, to perform some or all of the steps of the methods described above.

Any and all steps of the methods described above may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit). The communication device 750 may comprise electronic circuitry configured to perform some or all of the steps of the methods described above.

The invention claimed is:

1. A method for estimating a performance of a wireless communication network for a given time-frequency resource allocation, wherein said communications in said wireless communication network occur on a subset of time and frequency resources defined according to a frequency hopping sequence characterized in that said communications are subject to interferences whose activation is modeled by a binary random variable $b_t$ indicating whether an interferer is active or not at a time instant t, the discrete-time stochastic process $\{b_t\}_{t \in [-\infty;+\infty]}$ being modelled by a Markov chain with memory M on a finite space, M being a positive integer, said method comprising at least one iteration of:

Obtaining, from a receiver, at least one set of consecutive observations of interference activation $\{b_{t-M}, \ldots, b_t\}$;

Determining a frequency channel sequence $\{n_f(t-M), \ldots, n_f(t)\}$ associated with the at least one set of consecutive observations of interference activation $\{b_{t-M}, \ldots, b_t\}$ from said frequency hopping sequence, where $n_f(t)$ is an index of a frequency channel used for communicating at time t;

Identifying a Markov chain associated with the determined frequency channel sequence;

Updating a set of probabilities of the identified Markov chain according to the obtained at least one set of consecutive observations of interference activation.

2. The method according to claim 1, further comprising:

Estimating a value of a metric representing the performance of said wireless communication network for a first given time-frequency resource allocation responsive to said updated set of probabilities.

3. The method according to claim 2, wherein estimating a value of a metric representing the performance of said wireless communication network for a first given time-frequency resource allocation $\{n_t(p)\}_{p=1}^{N_p}$ from said updated set of probabilities, where Np is the number of packets to be transmitted during a given time window divided into time slots and $n_t(p)$ being an index of a time slot during which the p-th packet is transmitted comprises:

for each interference activation configuration of at least a subset of all possible interference activation configurations $[b_{-M}, \ldots, b_{N_w-1}] \in \{0, 1\}^{N_w+M}$, $N_w+M$ being a number of time slots:

obtaining Np values $p(b_{n_t(p)}|b_{n_t(p)-1}, \ldots, b_{n_t(p)-M})$ from the Markov chain with memory associated with a frequency channel sequence $n_f(n_t(p)-M), \ldots, n_f(n_t(p))$ where p varies from 1 to Np, $n_f(n_t(p))$ is an index of a frequency channel used for the transmission of the p-th packet defined according to the frequency hopping sequence;

computing a first value as the product of the obtained Np values $p(b_{n_t(p)}|b_{n_t(p)-1}, \ldots, b_{n_t(p)-M})$;

obtaining a second value equal to $f(\{g(b_{n_t(p)}, n_f(n_t(p)))\}_{p=1}^{N_p})$, where $f(\ )$ is representative of a performance of the wireless communication network at an application layer and $g(b_{n_t(p)}, n_f(n_t(p))) = b_{n_t(p)} \cdot \rho_{active,n_f(n_t(p))} + (1-b_{n_t(p)}) \cdot \rho_{inactive,n_f(n_t(p))}$, $\rho_{active,n_f(n_t(p))}$ being a signal to noise ratio measured on the frequency channel $n_f(n_t(p))$ when any interferer is active and $\rho_{inactive,n_f(n_t(p))}$ being a signal to noise ratio measured on the frequency channel $n_f(n_t(p))$ when no interferer is active;

computing a third value as the product of the first value and the second value; and summing the third values over all interference activation configurations of the subset.

4. The method according to claim 3, wherein computing a first value as the product of the obtained Np values $p(b_{n_t(p)}|b_{n_t(p)-1}, \ldots, b_{n_t(p)-M})$ for each interference activation configuration of a subset of all possible interference activation configurations $[b_{-M}, \ldots, b_{N_w-1}] \in \{0, 1\}^{N_w+M}$ comprises using a binary tree implementation.

5. The method according to claim 3, wherein $f(\{g(b_{n_t(p)}, n_f(n_t(p)))\}_{p=1}^{N_p}) = \hbar_{p=1}^{N_p} P_e(g(b_{n_t(p)}, n_f(n_t(p))))$, where $P_e(\cdot)$ is a function representative of the probability of error when receiving a packet.

6. The method according to claim 3, wherein $f(\{g(b_{n_t(p)}, n_f(n_t(p)))\}_{p=1}^{N_p}) = \hbar_{p=1}^{N_p} D(g(b_{n_t(p)}, n_f(n_t(p))))$, where $D(\cdot)$ is a function representative of the number of bits that can be transmitted on the time-frequency resource.

7. The method according to claim 1, wherein obtaining, from a receiver, at least one set of consecutive observations of interference activation comprises for at least one time slot:

measuring an interference plus noise level;

comparing said measured interference plus noise level with a threshold;

deducing the presence of interference responsive to said comparison.

8. The method according to claim 1, wherein updating a set of probabilities of the identified Markov chain according to the obtained at least one set of consecutive observations of interference activation comprises:

adding one unit to a value storing the number of all the occurrences of an event corresponding to said at least one set of consecutive observations of interference activation;

adding one unit to a total number of occurrences for the identified Markov chain; and computing the set of probabilities $p(b_t|b_{t-1}, \ldots, b_{t-M})$ responsive to these values.

9. The method according to claim 1, wherein updating a set of probabilities of the identified Markov chain according to the obtained at least one set of consecutive observations of interference activation comprises in the case where at least one observation is in an unknown state:

for each event corresponding to said at least one set of consecutive observations of interference activation with said at least one observation being in an unknown state, adding one unit to a value storing the number of all the occurrences of said event;

adding one unit to a total number of occurrences for the identified Markov chain; and computing the set of probabilities $p(b_t|b_{t-1}, \ldots, b_{t-M})$ responsive to these values.

10. The method according to claim 2, further comprising estimating a value of a metric representing the performance of said wireless communication network for a second given time-frequency resource allocation responsive to said updated set of probabilities and selecting the given set of time-frequency resource allocations associated with the best metric's value.

11. A device configured to estimate a performance of a wireless communication network for a given time-frequency resource allocation, wherein said communications in said wireless communication network occur on a subset of time and frequency resources defined according to a frequency hopping sequence characterized in that said communications are subject to interferences whose activation is modeled by a binary random variable $b_t$ indicating whether an interferer is active or not at a time instant t, the discrete-time stochastic process $\{b_t\}_{t \in [-\infty;+\infty]}$ being modelled by a Markov chain with memory M on a finite space, M being a positive integer, said method comprising at least one iteration of:

Obtaining, from a receiver, at least one set of consecutive observations of interference activation $\{b_{t-M}, \ldots, b_t\}$;

Determining a frequency channel sequence $\{n_f(t-M), \ldots, n_f(t)\}$ associated with the at least one set of consecutive observations of interference activation $\{b_{t-M}, \ldots, b_t\}$ from said frequency hopping sequence, where $n_f(t)$ is an index of a frequency channel used for communicating at time t;

Identifying a Markov chain associated with the determined frequency channel sequence;

Updating a set of probabilities of the identified Markov chain according to the obtained at least one set of consecutive observations of interference activation.

12. The device according to claim 11, wherein the processor is further configured to estimate a value of a metric representing the performance of said wireless communication network for a first given time-frequency resource allocation responsive to said updated set of probabilities.

13. A non-transitory computer readable medium including instructions thereon that can be loaded in a programmable device, the instructions causing implementation of the method according to claim 1 when the instructions are run by the programmable device.

14. A non-transitory information storage medium storing program code instructions that can be loaded in a programmable device, the program code instructions causing implementation of the method according to claim 1 when the program code instructions are read from the non-transitory information storage medium and run by the programmable device.

* * * * *